US012623223B2

(12) United States Patent
Lukhaub et al.

(10) Patent No.: US 12,623,223 B2
(45) Date of Patent: May 12, 2026

(54) DEVICE FOR SEALING OF A REAGENT CONTAINER

(71) Applicant: STRATEC SE, Birkenfeld (DE)

(72) Inventors: Waldemar Lukhaub, Birkenfeld (DE); Martin Trump, Birkenfeld (DE); Sara Zimmermann, Birkenfeld (DE)

(73) Assignee: STRATEC SE, Birkenfeld (DE)

( * ) Notice: Subject to any disclaimer, the term of this patent is extended or adjusted under 35 U.S.C. 154(b) by 559 days.

(21) Appl. No.: 18/198,508

(22) Filed: May 17, 2023

(65) Prior Publication Data

US 2023/0372942 A1 Nov. 23, 2023

(30) Foreign Application Priority Data

May 20, 2022 (LU) ........................................ 102954

(51) Int. Cl.
*B01L 3/00* (2006.01)

(52) U.S. Cl.
CPC ......... *B01L 3/523* (2013.01); *B01L 2300/042* (2013.01); *B01L 2300/0848* (2013.01)

(58) Field of Classification Search
CPC ......... B64D 27/40; B64D 27/402; F16C 7/02; F16C 7/026; Y02T 50/40; B01L 2200/0689; B01L 2200/142; B01L 2300/042; B01L 2300/0848; B01L 2300/123; B01L 3/523; B64C 1/16; B64C 2001/0081; E04C 3/30; F16S 3/00
See application file for complete search history.

(56) References Cited

U.S. PATENT DOCUMENTS

| | | | | |
|---|---|---|---|---|
| 5,741,275 | A * | 4/1998 | Wyssmann | F16N 11/10 604/145 |
| 11,000,851 | B2 | 5/2021 | Knight | |
| 2011/0293478 | A1 | 12/2011 | Mathieu et al. | |
| 2017/0266664 | A1 | 9/2017 | Lukhaub et al. | |
| 2017/0341073 | A1 * | 11/2017 | Knight | B65D 39/0017 |

FOREIGN PATENT DOCUMENTS

| | | | | |
|---|---|---|---|---|
| DE | 102011050478 | A1 * | 11/2012 | B01L 3/50825 |
| EP | 0909584 | A2 | 4/1999 | |
| EP | 3222352 | A1 | 9/2017 | |
| EP | 3629017 | A1 | 4/2020 | |
| WO | 2013034469 | A2 | 3/2013 | |

OTHER PUBLICATIONS

DE-102011050478-A1 English Translation (Year: 2026).*

* cited by examiner

*Primary Examiner* — Jennifer Wecker
*Assistant Examiner* — Jonathan Bortoli
(74) *Attorney, Agent, or Firm* — William Gray Mitchell

(57) ABSTRACT

A sealing for a reagent container and provides a sealing plug which can be adapted to the respective reagent container. Within the meaning of the present disclosure the terms plug, and stopper will be used synonymously. A liquid which is deposited in a reagent container like a vial or tube is protected by a plug from both, evaporation, and oxidation by ambient air during its presence in the reagent container. In addition, when the reagent container is provided to the analyser, the plug reduces evaporation and oxidation of liquids like reagents. A system comprising the plug and a method for using the plug are also disclosed.

15 Claims, 3 Drawing Sheets

DEVICE FOR SEALING OF A REAGENT CONTAINER

CROSS-REFERENCE TO RELATED APPLICATIONS

The present invention claims priority to Luxembourg patent application no. LU102954 filed on May 20, 2022. The afore mentioned application is incorporated herein by reference.

BACKGROUND OF THE INVENTION

Field of the Invention

The invention relates to a sealing for a reagent container.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

Automatic analyser systems in clinical diagnostics and life science have to be supplied with different reagents to run biochemical processes. The reagents are usually stored in consumable bottles, containers, or vials. The reagent containers can be of different sizes and are transported into the analyser system positioned in a rack. In general, the cover of each of the reagent containers has to be removed prior to loading into the analyser system. Thus, the reagent containers are in an open state supplied in the analyser system. As a result, due to the open state of the reagent containers, reagent evaporates and the concentration of the reagents changes, which may adversely affect the results of an analysis.

Typical reagent containers are sealed with a foil or film. The foil is punctured by a pipettor when approaching the reagent container for the first time. Thus, the opening size can be as small as the diameter of a needle of the pipettor. Alternatively, the foil can be removed by a user prior to inserting the particular reagent container into the analyser system or the rack, respectively. Consequently, in foil sealed reagent containers, an open state is always present during their presence in the analyser system. The reagent may evaporate on its entire upper surface because the entire upper surface of the liquid is exposed to the environment.

Only disposable needle tips are used when pipetting through the foil, because a contact between the foil and the whole needle of the pipettor cannot be avoided. When using pipettors with fixed needles, a cleaning of the whole needle is inevitable following every use. Such cleaning process is time-consuming, costly, and related to the use of huge amounts of cleaning fluid.

An elastic septum which is attached to a lid of the container can also be used for sealing of the reagent container. This septum has either an opening gap or a predetermined breaking point which opens when the pipette pierces the reagent container's septum for the first time. The opening gap or breaking point is usually formed as a line, a cross, or a star. The opening gap of the septum is not completely closed after removing a pipette's tip. However, due to the elasticity of the used material, the septum closes almost completely, when the needle or the pipette's tip is removed from the reagent container. The reagents are thus basically protected from evaporation. It is to be noted that, the use of an elastic septum for sealing of a reagent container results in a contact between the needle of the pipettor and the septum. The use of reusable needles (i.e., pipettors with fixed needles) requires a cleaning of the needle after every use. Such cleaning processes are time-consuming, costly, and related to the consumption of a lot of cleaning fluid.

A combination of an elastic septum and an opening mechanism is also known in the prior art for sealing reagent containers, wherein the opening mechanism is attached to the lid of the reagent containers. The lid has an annular wedge-shaped part, by which the septum can be spread. The lid including the wedge-shaped part is biased by a coil spring in an upper position, in which the septum is closed. By pressing the lid against the biasing force of the coil spring towards a lower position, the septum is spread. Thus, the opening of the septum is not accomplished by the needle of the pipettor, but by the lid itself. The needle itself is thus not in contact with the septum. If the resistance holding the lid in the lower position is removed, the lid returns to the upper position by the biasing force of the coil spring. The septum is closed again. However, the opening mechanism for actuating the lid of the reagent container in a pipettor having three axes has a complex structure. Since the reagent containers are located in a single position in the analyser system, a separate drive unit for opening and closing the elastic septum is necessary.

It is also known to use a folding or sliding mechanism for opening the lid of a reagent container in the analyser system. These configurations are normally used in analyser systems having the reagent containers arranged in a carousel. In such an arrangement, the pipettor is located at a fixed position and the reagent containers are rotated into the respective position below the pipettor by a rotational drive of the carousel. Within the rotational movement of the reagent container towards or away from the pipettor, the lid can be pushed against a fixed stop for actuating the folding or sliding mechanism of the lid into an opening or closing state. Thus, in a rotational loading system, the fixed stop can be arranged before the fixed pipettor, which causes an opening of the lid, and/or after the fixed pipettor, which causes a closing of the lid. Such folding or sliding mechanism for opening and closing the lid of a reagent container in the analyser system is described, for example, in the published European patent application EP 0 909 584 A2. However, with the one-time opening of the reagent container, for example during the loading and removal of the reagent containers from the analyser system, evaporation of the reagents cannot be prevented. Further, for an analyser system having a pipettor system with three axes, the above cannot be applied. For such a pipettor, since the reagent containers are located at one position, the lid cannot be pushed against the fixed stop. Thus, an additional drive concept is necessary. As a result, the analyser system becomes even more complex.

A further example for sealing a reagent container is disclosed in U.S. Patent Application Publication No. 2011/0293478 A1. This document refers to a tube which is inserted into a reagent container. The tube includes in its top portion an annular rim for bearing on the top end of the neck of the reagent container and means for centring in the neck of the reagent container. The tube has on its upper and lower end a slot, respectively. A suction needle is brought over the reagent container, to lie on the axis of the reagent container, and it is lowered into the container through the inserted tube close to the bottom thereof. The slot at the upper end of the tube enables an air flow between the neck of the reagent container and the annular rim, thereby enabling air to enter the container while the reagent is being sucked up from the reagent-taking needle. To facilitate taking reagent from the container, the bottom end of the tube includes the lower slot through which reagent passes. With the lower slot of the tube, the liquid can be drawn in, and with the upper slot of the tube, the necessary pressure exchange can take place. By providing a tube inserted in the reagent container, the surface of the liquid, which is in contact with the environment, can be minimized. However, the reagents are not completely protected from evaporation, since the surface of the liquid contacting the environment is merely minimized. Indeed, the reagent located in the tube can evaporate and may cause a difference in the concentration of the reagent.

Published U.S. Patent Application US 2017/0266664 A1 discloses a device for sealing a reagent container storing and providing liquids, in particular in an analyser system. The invention also relates to a reagent container using such a device for sealing, a cartridge for holding such a reagent container, and a method for removing a liquid from such a reagent container. The instant invention provides a device for sealing a reagent container comprising an annular member configured to be inserted into the reagent container, wherein the annular member is configured to being movably coupled to the reagent container relative to its longitudinal center axis; an opening passing from a top end of the annular member to a bottom end of the annular member; and a sealing element arranged between the top end and the bottom end of the annular member for sealing the opening.

Published U.S. Pat. No. 11,000,851 B2 relates to a method for reconstituting a lyophilized reagent contained within a reagent well comprises the steps of drawing a diluent into a pipette tip attached to an automated pipettor and dispensing the diluent into the reagent well containing the lyophilized reagent. The reagent well has an internal side wall, a bottom wall, and an open upper end and includes one or more retention features disposed about the periphery of the internal side wall and defining a central opening into the well that permits passage of the pipette tip into the reagent well. The one or more retention features are integrally formed with the internal side wall, and each of the one or more retention features extends over a portion of the lyophilized reagent, thereby retaining the lyophilized reagent within the reagent well. It is disadvantageous that a cap according to this document will be fixed to the upper end of a receptacle for receiving a fluid.

Published German patent application DE 10 2011 050478 A1 discloses a penetrable sealing element which is formed in conical or cylindrical section in section wise manner under formation of a channel. A penetration point is arranged at a closed end of the channel. The penetration point is formed as a nearly circular or rectangular or oval shaped material recess or material reduction. A rear section is arranged at an open end of the channel in circumferential manner. It is disadvantageous that a sealing element according to this document will be fixed to the upper end of a receptacle for receiving a fluid.

Another problem which is related to the use of a septum in a vial stopper is a blockage of a needle or pipette tip by the parts of the septum which are cut out. Further, solids like magnetic beads which are solved in the liquid may attach to a vial stopper.

Thus, there is a need for a sealing for a reagent container which avoids the above-mentioned disadvantages.

SUMMARY OF THE INVENTION

It is therefore the object of this invention to provide a vial plug capable of moving downwards in a reagent container for following a decreasing fluid level and allowing to aspirate a fluid from minimized dead volumes in a reagent container.

The present invention provides a plug for sealing of a container, comprising a conical funnel with a conical insertion slope, which has on an upper end at least one extending tongue and wherein an area around a lower end of the conical insertion slope is surrounded by an annular margin which provides on its outer circumference a sealing edge, wherein an outwardly angled sealing lip extends from the lower surface of the annular margin in an area close to the sealing edge, wherein below the lower surface of the annular margin an embossed piercing area with lid extends downwards, wherein a side wall of the embossed piercing area surrounding the lid does not extend below a lower end of the outwardly angled sealing lip.

The plug according to the present disclosure comprises in a further aspect at least one embossed stirring fin which is arranged on the lower surface of the annular margin between sealing lip and the piercing area formed by the embossed lid.

The plug comprises in another embodiment at least two extending tongues from the insertion slope on the upper end of the conical funnel for centring the upper end of the conical funnel.

It is further envisaged that the plug may comprise a sealing gap between sealing edge and sealing lip.

In a further aspect of the invention, the plug may have ab embossed lid with a polygonal shape regarding its outer circumference.

The invention refers also to a plug wherein the embossed lid has a reduced material thickness in comparison to the annular margin of the plug from which it extends.

It may also be intended that the outer circumference of the annular margin is cylindrical.

Another embodiment refers to a plug which is made of a polymer or silicone.

Another object of the present invention refers to a system for sealing of a container and handling of liquids within the container, comprising

- a plug as described above; and
- pipette tips, wherein a lower section of the pipette tip has a smaller diameter than an upper section of the pipette tip, and
- wherein only the lower end of the pipette tip having a smaller diameter is suitable to pass through the lower end of the plug's conical funnel.

The system may comprise a reagent container with a stop for the plug at the reagent container's inner surface.

It is further envisaged that the system may comprise a reagent container with a V-shaped bottom end.

A further object of the present invention relates to a method for storing and handling liquids in a reagent container, comprising the steps of

- Providing a liquid in the reagent container;
- Sealing the container with a plug as described above;
- Arranging a pipette tip on a pipette, wherein a lower end of the pipette tip has a smaller diameter than an upper part of the pipette tip;
- Piercing of the piercing area with embossed lid with the pipette tip's lower end; and
- Moving the pipette tip's lower end into the liquid for aspirating liquid.

The method may also comprise a step, wherein the plug is moved downwards by the shoulder of a pipette tip referring to the transition area of a pipette tip where the smaller diameter of a pipette tip's end widens towards its upper end.

In another embodiment, the method comprises the step of mixing the liquid by moving the sealed container and creating turbulences in the liquid by the embossed stirring fins.

The method may comprise the step of resuspending solid particles in the liquid.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The technical problem is solved by the independent claims. The dependent claims cover further specific embodiments of the invention.

The present invention provides a sealing plug which can be adapted to the respective reagent container. Within the meaning of the present disclosure the terms plug, and stopper will be used synonymously. A liquid which is deposited in a reagent container like a vial or tube is protected by a plug from both, evaporation, and oxidation by ambient air during its presence in the reagent container. In addition, when the reagent container is provided to the analyser, the plug reduces evaporation and oxidation of liquids like reagents.

The microfluidic device according to the present disclosure can be made of a polymer or silicone, which allows the manufacture by injection moulding employing a moulding tool called a mould which comprises two halves or plates. In or for an injection moulding machine, polymers are plasticized in an injection unit and injected into a mould. The cavity of the mould determines the shape and surface texture of the finished part. The polymer materials need to be treated carefully to prevent oxidation or decomposition as a result of heat or sheer stresses. Heat and pressure are applied to press molten polymer into the structured surface of the master. Depending on the polymer, the thickness of the part and complexity of the structures the cycle time can be a few seconds (e.g., for isothermal moulding of optical discs) up to several minutes (for example for variothermal moulding of thick parts with high aspect ratio microstructures). After a suitable filling, cooling and hardening time (noting that cooling and hardening take place together for thermoplastics), the heat and pressure are removed and the finished plastics structure is ejected from the mould. The injection moulding process can then be repeated using the same master.

It is to be noted that there is a difference between the storage and the use of a liquid in a reagent container. Evaporation is to be prevented during storage of a liquid in a reagent container, to prevent evaporation refers to these circumstances. Evaporation is to be reduced during use of the liquid in a reagent container after opening of the embossed lid, so that evaporation is reduced at this step.

The reduction of evaporation is achieved by piercing an embossed lid located on a bottom surface of the sealing plug. The opening resulting from opening said lid by piercing the surrounding piercing area is much smaller compared to the cross-section of an opening of a reagent container like a tube or vial, which reduces evaporation of the liquid comprised therein, and minimizes or reduces gas exchange and condensation of ambient moisture into the container.

Figure 1:
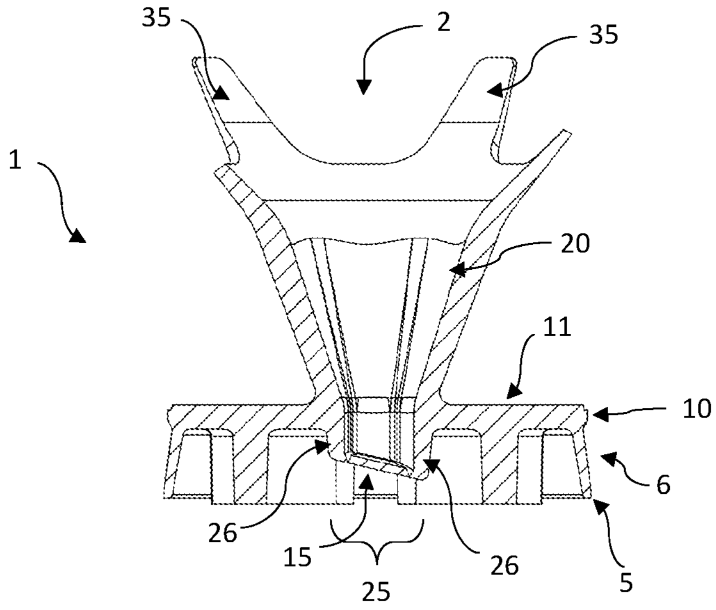
FIG. 1 shows a cross-sectional view of a plug according to the invention for a reaction container.

FIG. 1 shows a cross-sectional view of a plug 1 for a reaction container (not shown). Plug 1 has a conical shaped funnel 20 with respect to its opening 2 so that the opening 2 has a larger diameter at its top than at its bottom. Plug 1 is clamped into a reagent container by means of at least one tongue 35 extending from the upper end of the conical shaped funnel 20 and held in position by static friction. The area around the end of the conical shaped funnel 20 comprising the embossed piercing area 25 with lid 15 that is surrounded by side wall 26. Annular margin 11 is a circular surface with a sealing edge 10 on its outer end. The static friction of the sealing plug 1 is caused by at least one tongue 35 and sealing edge 10 allowing a vertical displacement or movement of plug 1 in a reagent container. The at least one tongues 35 is used for centring the plug in the vial.

The sealing edge 10 shown in FIG. 1 provides the seal to the environment and is a kind of support for the softer shaped sealing lip 5 arranged below sealing edge 10 and extending from the lower surface of the annular margin 11. In case that solids like microparticles (not shown) are present in a liquid, the sealing lip 5 prevents said microparticles from entering a sealing gap 6 between sealing lip 5 and sealing edge 10 so that the microparticles may get lost causing a change in their concentration in the respective liquid.

Figure 2:
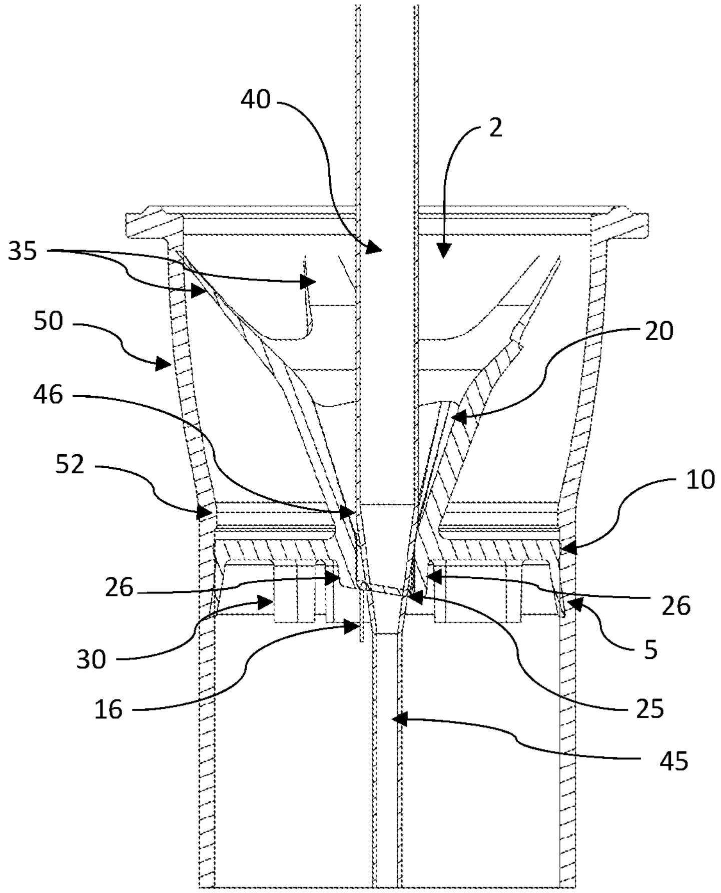
FIG. 2 shows a sectional view through a container which is inserted into a reagent container with a cylindrical cross section.

FIG. 2 shows in a sectional view of a pipetting needle 40 which already penetrated the embossed piercing area 25 of the plug. The plug is located in a reagent container 50 with a cylindrical cross section and a stop for the plug 52. The conical shaped funnel 20 of the plug's opening 2 is used to guide a pipetting tip 45 of a pipette 40 (comp. FIG. 2) to the embossed piercing are 25 (which can be made in an embodiment of the plug of a different material than the rest of the plug).

The V-shape of a plug according to the present disclosure minimizes the dead volume. The at least one tongue 35, the conical shaped funnel 20, the sealing edge 10, and the sealing lip 5 cause a centralised position of the inserted plug together with a central guiding of the tip of a pipette needle.

The combination of said features with a V-shaped bottom of a consumable results in a minimized dead volume.

The at least one tongue causing the centralized positioning of the plug can be regarded as a prerequisite for allowing a movement of the plug in a reagent container downwards for following a decreasing fluid level and for aspirating fluids from a minimized dead volume through the embossed piercing with lid 15 surrounded by side wall 26 which does not extend below the lower end of sealing lip 5. Thus, the use of the at least one tongue in combination with the embossed piercing area contribute synergistically to the solve the above-mentioned problem.

The pipetting needle 40 is guided through the conical shaped funnel 20 on a centred axis to the embossed piercing area 25 for piercing its lid 15 which is then separated from the piercing area and folded away. The pipette tip 45 has a reduced diameter at its lower end in comparison to the pipette's upper end so that only the pipette's tip 45 can pass through the conical shaped funnel's lower end and will push the plug into the consumable for following the upper liquid level during aspiration of a liquid.

Figure 3:
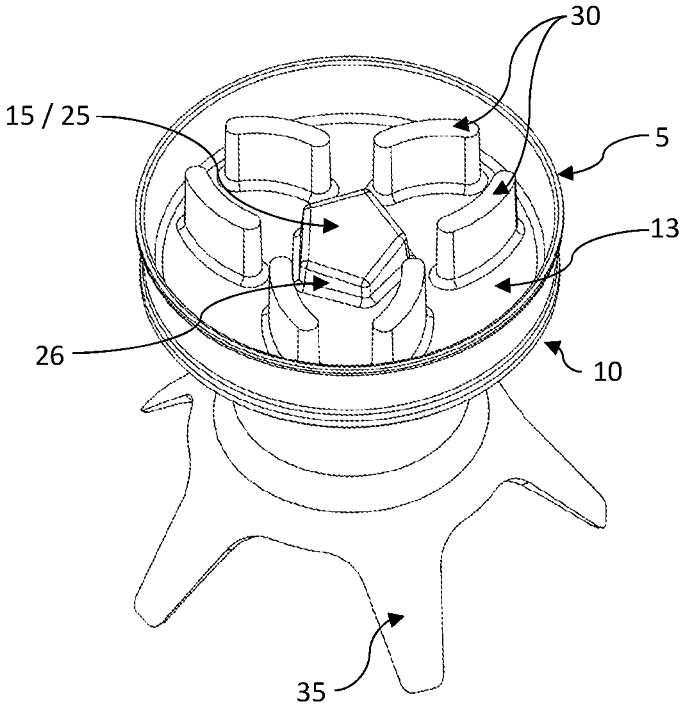
FIG. 3 shows a perspective view onto a plug according to the invention from the bottom.

FIG. 3 shows a perspective view onto a plug's bottom. The embossed piercing area 25 with lid 15 that is surrounded by side wall 26 is extending centrally from the lower surface 13 of the annular margin 11 (comp. FIG. 3) which can be slanted with respect to a fictional horizontal line in an embodiment for easier piercing with pipette tip 45. It is to be noted that side wall 26 is not extending below the lower end of sealing lip 5. A predetermined breaking point can be influenced by the type and depth of the embossing for the force required for piercing. During piercing, the material of a separated lid 16 (comp. FIG. 2) remains attached to the plug 1 at the lower end of the conical shaped funnel 20. Thus, there is no risk of separated material entering the liquid and thus possibly causing the pipetting tip 45 to clog. The separated material of the separated lid 16 will remain attached to at least one side surface of the embossed piercing area 25 and fold away. In the case of alternative solutions employing a foil for sealing, it may otherwise happen in a worst case that the needle or pipette tip is blocked by the "punched out" piece of the foil.

The tip 45 of the pipetting needle 40 reaches the liquid which is present in the reagent container following piercing of the plug's embossed piercing area 25. The embossed piercing area may have a polygonal shape. FIG. 3 shows a piercing area 25 with five corners. The polygonal shape of the piercing area 25 is intended for preventing a cylindrical pipetting needle from sealing against the extending side walls 26 of piercing area 25. This avoids negative pressure inside the container during liquid aspiration, which would have a negative effect on the pipetting accuracy.

Furthermore, the embossed piercing area 25 of the plug can be made of a material allowing only a pipette tip 45 which has a smaller diameter than an upper part of the pipette tip to pass the piercing area 25 and thus reaching the liquid in the reagent container (comp. FIG. 2). Basically, the diameter of the pierced opening is smaller than the cross-sectional diameter of the pipetting needle's tip 45, so that only the tip of the pipetting needle is getting in contact with the liquid and this wetted by the liquid.

Liquid level detection (LLD) and tracking are used to detect whether the tip of the pipetting needle reaches the liquid during its descent into the reagent container through the plug according to the present disclosure. Via the shoulder 46 at the transition to the larger diameter of the pipetting needle, the plug may follow the sinking liquid level with each further immersion. The displacement force and the piercing force are adapted so that the displacement forces are higher than the required piercing force to prevent the plug from moving while trying to pierce the piercing area.

The described plug is intended to be part of a system comprising the plug and a correspondingly shaped pipette needle. Further a reagent container may be part of the system, wherein the reagent container comprises a circumferential stop located above the inserted plug which serves as a stop to prevent the plug from sliding up or out of the reagent container. The ridge may be required due to the occurrence of overpressure in the filled, sealed reagent by trapped air when inserting the stopper, during filling, during transport, during heating, etc., or during filling of the reagent container.

The pipetting tip is rinsed after each pipetting process to prevent a carryover. In the case of a non-tracking sealing systems (e.g., septum or punctured foil), the needle is wetted over its entire length and must therefore also be rinsed over its entire length. This process costs time and increases the consumption of cleaning fluids.

FIG. 3 shows the bottom side of the sealing plug with stirring fins 30, the embossed piercing area 25 with lid 15, sealing lip 5, and sealing edge 10. The fins 30 can be used for creating turbulences in an automated reagent system with stirrer drive for the resuspension of microparticles which may be part of the liquid in the reagent container. Turbulences created by rotation of the reagent container around its vertical axis of symmetry can be caused following overhead storage, to dislodge and resuspend the located or adherent microparticles in the liquid again. As an alternative method, the plug can be driven by the fins on the stopper so that the stopper is rotated and the microparticles present or adhering to it are detached and resuspended.

At the same time, the fins 30 protrude so that the plug does not rest on sealing lip 5 in an "upright" position when a stopper is placed on a surface (e.g., in automated conveyor lines for mechanical insertion of the stoppers) in order to avoid damage of sealing lip 5. Care has also been taken to ensure that the mass distribution is asymmetrical in a way to facilitate transport and orientation on a vibratory feeder line in an upright orientation meaning that the upper end is orientated to the top.

Figure 4:
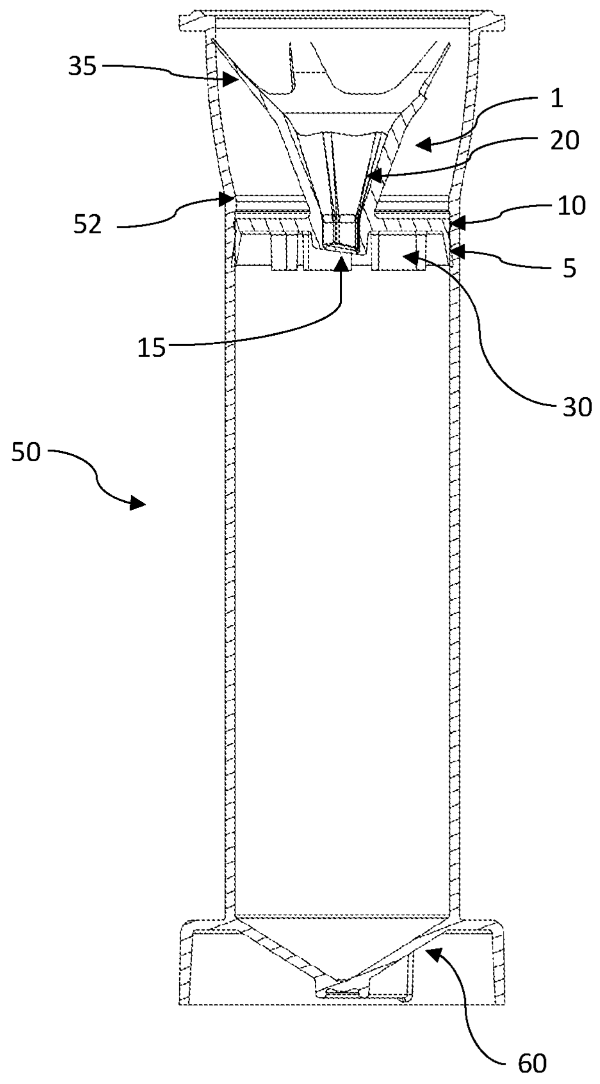
FIG. 4 shows a plug which is located at the top end of a reagent container with a V-shaped bottom.

FIG. 4 shows a plug which is located at the top end of a reagent container with a V-shaped bottom 60. Plug 1 is positioned via its tongues 35 in a centralised position in reagent container 50. A stop for the plug 52 prevents a slip-out of the plug. Below stop 52 is the sealing edge 10 and below sealing edge 10 is the sealing lip 5 located. Lid 15 is the bottom end of the conical shaped funnel 20. Stirring fins 30 are located between lid 15 and sealing lip 5. The reagent container 50 has a V-shaped bottom 60.

The vial stopper can be produced in a single step, so that production via injection molding is possible.

The advantages of a system according to the present disclosure relate to

- preventing of evaporation and oxidation and leakage protection during storage and transport of a liquid in a reagent container before opening the embossed lid.
- reducing evaporation and oxidation of a liquid in a reagent container when used in automatic analysers and thus increasing the stability in the processing of the liquids.
- reducing the dead volume in a container due to the use of a V-shaped (cone-shaped) bottom in the container.
- possibility to resuspend solid particles in a liquid.
- adjustable sealing system.

no clogging of the pipetting needle by separated materials.

asymmetric mass distribution of the stopper to facilitate transport and orientation on a vibratory feeder path.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS

1 plug
2 plug opening
5 sealing lip
6 sealing gap
10 sealing edge
11 annual margin
13 lower surface
15 lid
16 separated lid
20 conical shaped funnel
25 embossed piercing area
26 side wall
30 stirring fin
35 tongue
40 pipette
45 pipette tip
46 shoulder of pipette tip
50 reagent container
52 stop for plug
60 v-shaped bottom

What is claimed is:

1. A plug for sealing of a reagent container, the plug comprising:

a conical funnel having:

a conical insertion slope having:

a conical insertion slope lower end;

a conical insertion slope upper end;

a first tongue;

an outwardly angled sealing lip having an outwardly angled sealing lip lower end;

an annular margin having an annular margin lower surface, an annular margin outer circumference and a sealing edge;

a first area around the conical insertion slope lower end;

a second area proximal to the sealing edge;

an embossed piercing area extending downwards below the annular margin lower surface and having a side wall and a lid; wherein the embossed piercing area surrounding the lid; the first area is surrounded by the annular margin and defines the sealing edge on the annular margin outer circumference; the outwardly angled sealing lip extends from the annular margin lower surface in the second area; and the side wall does not extend below the outwardly angled sealing lip lower end.

2. The plug of claim 1, wherein the conical insertion slope comprises at least one embossed stirring fin arranged on the annular margin lower surface and wherein the annular margin lower surface is disposed between the outwardly angled sealing lip and the embossed piercing area surrounded by the lid.

3. The plug of claim 1, wherein the conical insertion slope has a conical insertion slope upper end and further comprises a second tongue extending from the conical insertion slope upper end.

4. The plug of claim 1, further comprising a sealing gap between the sealing edge and the outwardly angled sealing lip.

5. The plug of claim 1, wherein the lid has a first thickness and the annular margin has a second thickness thicker than the first thickness.

6. The plug of claim 1, wherein the embossed lid has a lid circumference and a polygonal shape.

7. The plug of claim 1, wherein the annular margin outer circumference is cylindrical.

8. The plug of claim 1, comprising a polymer material or a silicone material.

9. A system for sealing a reagent container and for handling liquid within the reagent container, the system comprising:

the plug according to claim 1; and a plurality of pipette tips, each pipette of the plurality of pipette tips comprising a pipette tip lower section having a first diameter and a pipette tip upper section having a second diameter, wherein the first diameter is smaller than the second diameter, and the conical funnel has a conical funnel lower end and a third diameter sized to enable only the pipette tip lower section to pass through the conical funnel lower end and to prevent the pipette tip upper section from passing through the conical funnel lower end.

10. The system of claim 9, further comprising the reagent container wherein the reagent container has a reagent container inner surface and a stop for the plug at the reagent container inner surface.

11. The system of claim 9, further comprising the reagent container wherein the reagent container has a V-shaped reagent container bottom end.

12. A method of storing and handling liquid in a reagent container using the plug according to claim 1, the method comprising:

introducing a liquid into the reagent container;

sealing the reagent container using the plug;

arranging a pipette tip on a pipette, wherein the pipette tip has a pipette tip lower end having a first diameter and a pipette tip upper end having a second diameter and the first diameter is smaller than the first diameter;

piercing the piercing area using the pipette tip lower end;

submerging the pipette tip lower end into the liquid within the reagent container; and aspirating an amount of liquid from the reagent container through the submerged pipette tip lower end.

13. The method of claim 12, wherein the pipette tip further comprises a shoulder and a transition area having a transition diameter widening from the first diameter to the second diameter, the method further comprising moving the plug downwards by the shoulder.

14. The method of claim 12, further comprising: mixing the liquid by moving the reagent container sealed with the plug and creating turbulence in the liquid using embossed stirring fins.

15. The method of claim 14, wherein the liquid comprises solid particles in the liquid in the reagent container and the method further comprises resuspending the solid particles in the liquid in the reagent container.

* * * * *